E. NORTON.
MANUFACTURE OF METAL SHEETS.
APPLICATION FILED APR. 15, 1914.
1,113,474.
Patented Oct. 13, 1914.
2 SHEETS—SHEET 1.
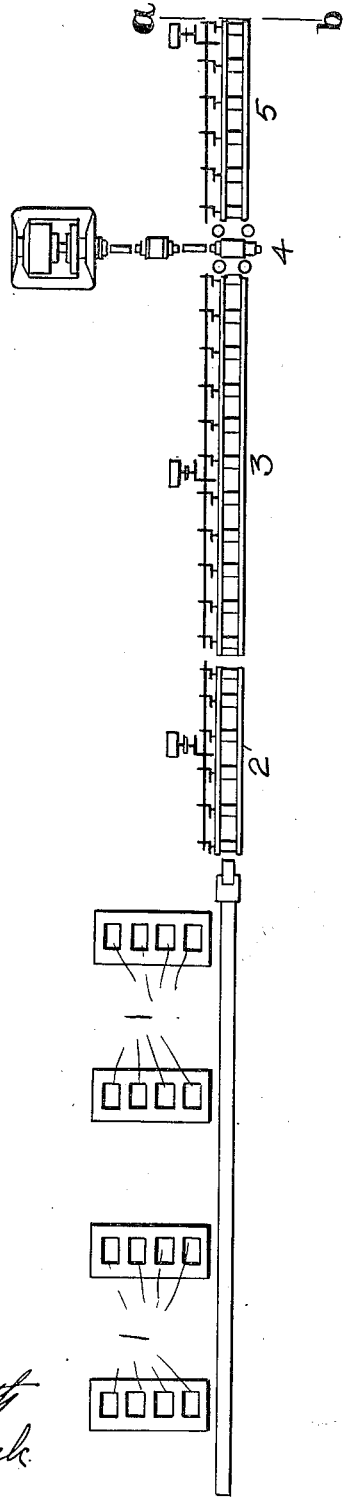
WITNESSES
INVENTOR
Edwin Norton
ATTORNEY E. NORTON.
MANUFACTURE OF METAL SHEETS.
APPLICATION FILED APR. 15, 1914.
1,113,474.
Patented Oct. 13, 1914.
2 SHEETS—SHEET 2.
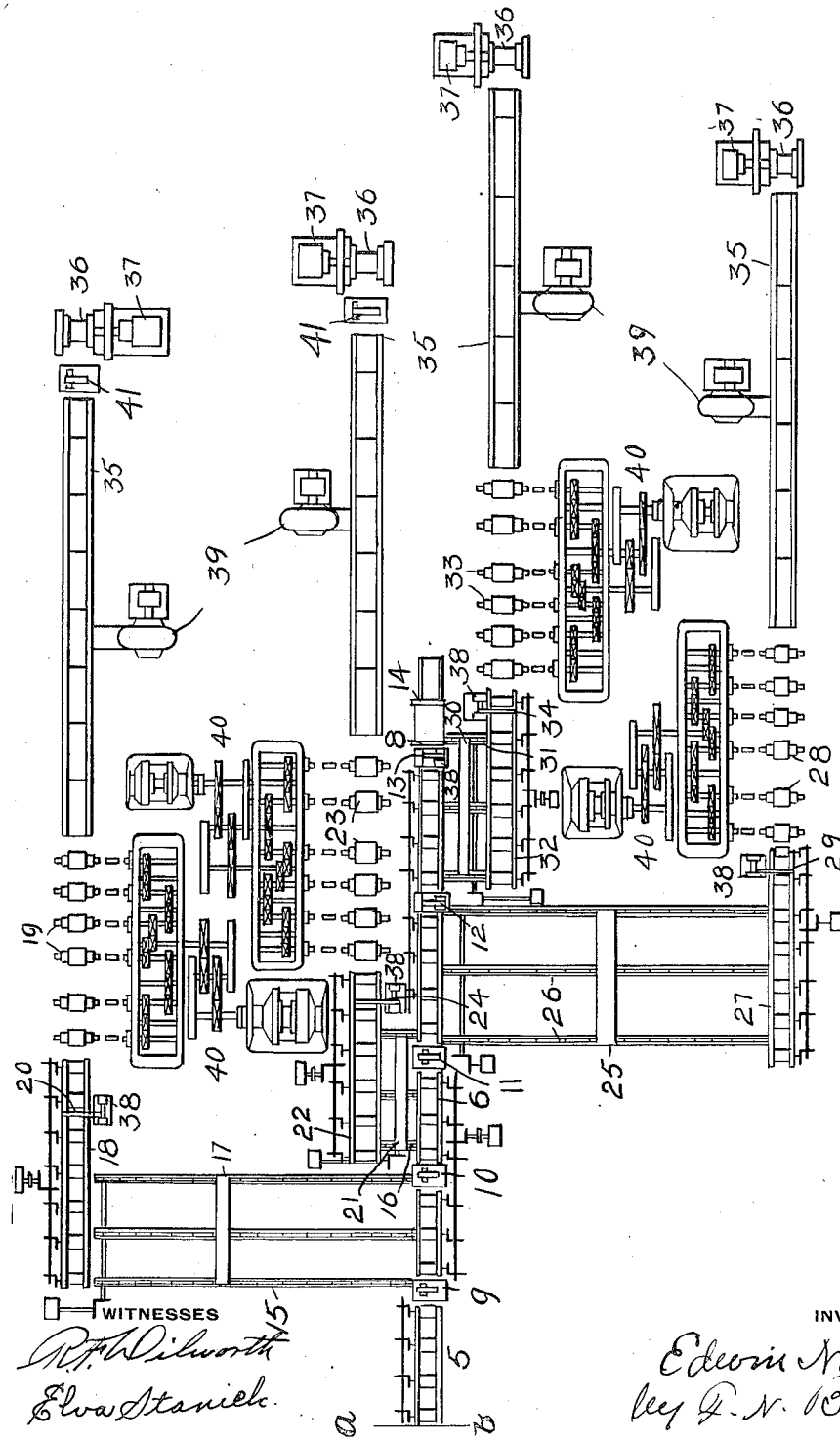
WITNESSES
INVENTOR
Edwin Norton
ATTORNEY

UNITED STATES PATENT OFFICE.

EDWIN NORTON, OF PAGET WEST, BERMUDA.

MANUFACTURE OF METAL SHEETS.

1,113,474. Specification of Letters Patent. Patented Oct. 13, 1914.

Application filed April 15, 1914. Serial No. 831,950.

*To all whom it may concern:*

Be it known that I, EDWIN NORTON, a citizen of the United States, residing at Cedar Lodge, Paget West, Island of Bermuda, have invented new and useful Improvements in the Manufacture of Metal Sheets, of which the following is a specification.

My invention relates to the manufacture of metal sheets.

The principal object of my invention is to produce from a single long heated plate a number of finished sheets of uniform gage by causing the sheets to be simultaneously rolled in separate finishing mills without reheating the metal. Heretofore, so far as I am aware, it has been proposed to roll an ingot, after it has been uniformly heated to the proper temperature, into a long plate, which is sheared into shorter plates. These latter plates are then fed to reducing rolls so that some of the plates are subjected to the cooling action of the atmosphere for a longer time than others. By my invention, I propose to cause these shorter plates or their equivalents cut from the same long plate to be transferred from the shears to the reducing rolls at such a rate and under such regulation that all of the shorter plates will enter the reducing rolls at substantially the same time, which insures that the shorter plates shall all have substantially the same temperature and that the sheets issuing from the rolls shall all have the same gage provided the different sets of reducing rolls are all in the same condition to produce sheets of the same gage from plates in uniform condition, this condition being required to secure the best results.

Referring to the accompanying drawing, which shows diagrammatically a rolling mill designed to produce metal sheets in accordance with my invention, I show a number of soaking pits 1, in which ingots to be rolled into sheets are heated uniformly to the proper temperature. The properly heated ingots are taken from the pits, one at a time and delivered to the approach table 2 in any of the well known ways. From the table 2 the ingot is delivered to the entering table 3 which delivers the ingot to the universal mill 4. The ingot is delivered from the mill 4 to the run-out table 5, and is then given passes back and forth in the mill 4 until it has been reduced to a plate of the desired cross-section and length in a manner well known. The said plate is conveyed by the run-out table 5 to the shear table 6, which moves the plate thereon until its forward end engages the stop 8, which prevents further travel of the plate until the stop 8 is removed. 9, 10, 11, 12, and 13 are shears arranged to shear the said plate transversely while it rests on the shear-table 6. The shear 9 is arranged to shear off the rear crop end from the plate. The shear 11 is arranged to divide the plate into halves, allowing for an imperfect portion to be cut from the forward end of the plate. The shear 10 is arranged to divide the rear half of the plate into halves. As soon as the shear 11 severs the plate, the stop 8 is removed from the end of the plate, which is then moved by the table 6 until it engages the stop 14. The stop 14 is located enough in advance of the stop 8 to allow the rear end of the forward half of the plate to move past the shear 11 for a purpose to be explained presently. When the front half of the plate engages the stop 14 the shear 13 cuts off the crop end therefrom and the shear 12 divides the said half of the plate into halves.

I have not shown the stops 8 and 14 in detail, nor how they may be operated, as these are matters which any one skilled in the art can supply. The stops may be mere blocks, or levers or bars insertible in the path of the sheet. The stops may be operated by hand or by other means which will readily occur to those familiar with the art. I prefer motors for the stops.

Preferably, as soon as the shears 9, 10, and 11 have severed the plate, the sections severed by the shears 10 and 11 are transferred laterally to the left by the endless chain or similar conveyers 15 and 16, respectively, driven in any desired manner. The plate 17 cut off by the shear 10 is transferred to the entering table 18 in line with the tandem train of reducing rolls 19. The plate 17 is delivered by the table 18 toward the rolls 19 until its forward end engages the stop 20. The plate 21 is cut off by the shear 11 and transferred by the chain carrier 16 to the entering table 22 in line with the tandem train of reducing rolls 23. The plate 21 is moved toward the rolls 23 until it engages with the stop 24. The plate 25 cut off by the shear 12 is transferred to the right by the endless chain carrier 26 to the entering table 27, by which it is moved toward the tandem train of rolls 28 until it engages the stop 29. The last plate 30 is transferred to the right by the endless chain carrier 31 to the entering table 32, by which it is moved toward the tandem train of rolls 33 until it engages the stop 34.

Preferably the tables 2, 3, 5 and 6 are in a straight line and the tables 18, 22, 27, and 32 are parallel therewith. The frames of the shears 9, 10, and 11 are open toward the left so that the plates 17 and 21 may move to the left without interference by the said frames, and the frames of the shears 12 and 13 are open toward the right so that the plates 25 and 30 may move to the right without engagement with the said frames. The front half of the long plate is fed from the stop 8 to the stop 14 in order that the rear end of the said half may clear the frame of the shear 11. Shears with open or U-shaped frames are old and well known and have, therefore, not been illustrated.

The plates 17, 21, 25, and 30 are transferred from the shear tables so as to reach their respective trains of rolls simultaneously. This may be accomplished by causing the chain carriers to carry the plates to their entering tables 18, 22, 27, and 32 at such different speeds that they will all reach their entering tables simultaneously.

I do not limit my invention to any definite means or method of getting the plates to the rolls simultaneously. The stops 20, 24, 29 and 34 are provided in order to hold back the plates in case some of them should be in position to enter the rolls before the others. In case the plates all travel so as to be ready to enter the rolls at the same time, the stops might be removed from the path of the plates, or not interposed in their path, as the case may be.

I do not limit my invention to the precise type of finishing rolls for the plates, but I prefer the train of rolls shown in Letters Patent, No. 865,055 granted to me on the third day of September, 1907, in which train of rolls the sheets are reduced in each stand of rolls and simultaneously stretched between consecutive stands of rolls.

After the sheets have been subjected to the finishing rolls 19, 23, 28 and 33, they are delivered by the said rolls to the feed tables 35, there being one table 35 in line with each train of rolls. From the tables 35 the sheets may be wound up on the coilers 36 arranged at the ends of the tables, 37 indicating the motors for the coilers. While these feed tables may be of any suitable type, I prefer the air conveyer shown in Letters Patent No. 898,775 granted to me on the 15th day of September, 1908. On the drawings 39 indicates the fan for such air conveyers.

38 designates motors or mechanism of any preferred type, whether electric, steam, hydraulic, compressed air, or the like by which the stops hereinbefore mentioned may be moved into and out of the paths of the plates.

By arranging the conveying and rolling mechanisms on opposite sides of the shear table 5, I materially shorten the distance which the short plates made by the shears 12 and 13 have to travel in order to reach their entering tables and, therefore, prevent unnecessary cooling of the plates; I shorten the shear table 5, since, if the plates 25 and 30 were to be transferred toward the left, their transferring mechanism would have to be beyond the coilers 36 for the sheets made from the plates 17 and 21. The sets or groups of conveying and sheet rolling apparatus on opposite sides of the shear table 5 are duplicates. The rear conveyers 15 and 26 of each set or group are longer than the conveyers 16 and 31, so that the rolls 19 and 28 are farther away from the shear table 5 than the rolls 23 and 33. The driving mechanisms 40 for the trains of rolls in each of said sets or groups are located in the space between the two trains of rolls, and between the longer chain conveyer and the fans 39. By this arrangement the width of the mill plant is very much reduced. Shears 41 may be employed to cut the sheets into lengths when it is not desired to coil them, the coiler in such case not being operated.

I claim—

1. The method of manufacturing metal sheets which consists in reducing a heated ingot or the like to a long plate, severing the plate into shorter plates, transferring the shorter plates laterally to separate reducing means, and causing the said shorter plates to be subjected to the action of the said reducing means substantially at the same time.

2. In a rolling mill, means for reducing a heated ingot or the like to a long plate, means for severing the said plate into shorter plates, reducing rolls arranged laterally of the severing means and at different distances therefrom, and means for delivering the shorter plates from the severing means to the reducing rolls substantially simultaneously.

3. In a rolling mill, means for reducing a heated ingot or the like to a long plate, a shear table arranged to receive the said plate, means for stopping the travel of the plate on the table, two sets of shears on the table, one set opening toward one side of the table and the other set toward the other side of the table, means for transferring the short plates formed by the first set of shears laterally in the direction toward which the said set of shears open, a second stop for the plate when released from the first stop, the second stop being located so as to allow the rear end of the plate formed by the last shear in the first set to clear the frame of the said last shear, means for transferring the shorter plates formed by the second set of shears in the opposite direction from that in which the plates formed by the first set of shears were fed, and separate reducing rolls arranged to receive the several shorter plates.

4. The method of manufacturing metal sheets which consists in reducing a heated ingot or the like to a long plate, severing the plate into shorter plates, transferring the shorter plates laterally to separate reducing means, and causing the said shorter plates to be reduced in thickness at substantially the same time.

5. In a rolling mill, means for reducing a heated ingot or the like to a long plate, means for severing the said plate into shorter plates, reducing rolls arranged laterally of the shorter plates and at different distances therefrom, means for delivering the shorter plates from the severing means to the reducing rolls substantially simultaneously, means for conveying the finished sheets from the reducing rolls, and means for shearing the same into any desired lengths.

6. The method of manufacturing metal sheets which consists in reducing a heated ingot or the like to a long plate, severing the plate into shorter plates, transferring the shorter plates laterally to separate reducing means, causing the said shorter plates to be reduced in thickness at substantially the same time, and coiling the finished sheets into rolls.

7. The method of manufacturing metal sheets which consists in reducing a heated ingot or the like to a long plate, severing the plate into shorter plates, transferring the shorter plates to separate reducing means, and causing the said shorter plates to be subjected to the action of the said reducing means substantially at the same time.

8. The method of manufacturing metal sheets which consists in reducing a heated ingot or the like to a long plate, severing the plate into shorter sections, transferring the shorter sections at different speeds to separate reducing means located at different distances from the severing means so that the sections shall reach the reducing means at substantially the same time, and subjecting the sections to the action of the reducing means at substantially the same time.

Signed at Hamilton Bermuda this 1st day of April 1914.

EDWIN NORTON.

Witnesses:
 EDWIN G. RUSSELL,
 W. MAXWELL GREENE.